(12) United States Patent
Darsch et al.

(10) Patent No.: US 12,277,737 B2
(45) Date of Patent: Apr. 15, 2025

(54) METHOD FOR ENCODING A DIGITAL IMAGE IN ORDER TO COMPRESS SAME

(71) Applicant: SHADOW, Paris (FR)

(72) Inventors: Amaury Darsch, Lorient (FR); Lucas Clarté, Gagny (FR)

(73) Assignee: SHADOW, Paris (FR)

( * ) Notice: Subject to any disclaimer, the term of this patent is extended or adjusted under 35 U.S.C. 154(b) by 361 days.

(21) Appl. No.: 17/757,532

(22) PCT Filed: Dec. 16, 2020

(86) PCT No.: PCT/FR2020/052464
§ 371 (c)(1),
(2) Date: Jun. 16, 2022

(87) PCT Pub. No.: WO2021/123617
PCT Pub. Date: Jun. 24, 2021

(65) Prior Publication Data
US 2023/0009035 A1   Jan. 12, 2023

(30) Foreign Application Priority Data

Dec. 19, 2019  (FR) ...................................... 1914826

(51) Int. Cl.
*G06T 9/00* (2006.01)
*G06V 10/44* (2022.01)
*H04N 19/90* (2014.01)

(52) U.S. Cl.
CPC ............... *G06T 9/00* (2013.01); *H04N 19/90* (2014.11); *G06V 10/44* (2022.01)

(58) Field of Classification Search
None
See application file for complete search history.

(56) References Cited

U.S. PATENT DOCUMENTS

| | | | | |
|---|---|---|---|---|
| 7,230,616 B2* | 6/2007 | Taubin | ...................... | G06T 9/00 382/233 |
| 8,207,965 B2* | 6/2012 | Vinchon | ................. | G06V 9/001 382/241 |
| 8,502,815 B2* | 8/2013 | Stefanoski | .............. | G06T 9/001 345/428 |
| 8,654,146 B2* | 2/2014 | Fenney | ...................... | G06T 9/00 345/620 |
| 11,631,218 B2* | 4/2023 | Vytyaz | ................... | G06T 9/004 345/418 |
| 12,125,249 B2* | 10/2024 | Joshi | ...................... | G06T 9/001 |

OTHER PUBLICATIONS

Edelsbrunner, Letscher, and Zomorodian. "Topological persistence and simplification." Discrete & computational geometry 28 (2002): 511-533. (Year: 2002).*

(Continued)

*Primary Examiner* — Michelle M Entezari Hausmann
(74) *Attorney, Agent, or Firm* — BCF LLP (57) ABSTRACT

The disclosure relates to a method of encoding a digital image in order to compress same, the digital image being defined as a point cloud associating a set of N pixels, designated as vertices, to a scalar intensity value. The method aims at establishing triangulation vertices of the digital image and implements the principles of algorithmic topology.

12 Claims, 5 Drawing Sheets

(56) References Cited

OTHER PUBLICATIONS

Vidal, Jules, Pierre Guillou, and Julien Tierny. "A progressive approach to scalar field topology." IEEE Transactions on Visualization and Computer Graphics 27.6 (2021): 2833-2850. (Year: 2021).*
Durand, Fredo, George Drettakis, and Claude Puech. "Fast and accurate hierarchical radiosity using global visibility." ACM Transactions on Graphics (TOG) 18.2 (1999): 128-170. (Year: 1999).*
Hofer, Christoph D., Roland Kwitt, and Marc Niethammer. "Learning representations of persistence barcodes." Journal of Machine Learning Research 20.126 (2019): 1-45. (Year: 2019).*
Biasotti S, De Floriani L, Falcidieno B, Frosini P, Giorgi D, Landi C, Papaleo L, Spagnuolo M. Describing shapes by geometrical-topological properties of real functions. ACM Computing Surveys (CSUR). Oct. 15, 2008;40(4):1-87. (Year: 2008).*
Neves JM, Persiano RM. Visualizing scalar fields represented by adaptive square triangulations. InProceedings X Brazilian Symposium on Computer Graphics and Image Processing Oct. 14, 1997 (pp. 95-102). IEEE. (Year: 1997).*
Carlsson et al., On the Local Behavior of Spaces of Natural Images, Int J Comput Vis, (2008), vol. 36, pp. 1-12.
Chittajallu et al., Vectorized Persistent Homology Representations for Characterizing Glandular Architecture in Histology Images, 2018 IEEE 15th International Symposium on Biomedical Imaging (ISBI 2018), Apr. 4-7, 2018, 4 pages.
Cuadros-Vargas et al., Generating Segmented Quality Meshes from Images, J Math Imaging Vis, (2009), vol. 33, pp. 11-23.
Edelsbrunner et al., Computational Topology—an Introduction, Semantic Scholar, Published Dec. 8, 2009.
International Search Report for International Application No. PCT/FR2020/052464 dated Mar. 29, 2021, 2 pages.
International Written Opinion for International Application No. PCT/FR2020/052464 dated Mar. 29, 2021, 9 pages.
Lehner et al., Image Compression Using Data-Dependent Triangulations, Advances in Visual Computing, (2007), pp. 351-362.
Marwood et al., Representing Images in 2000 Bytes: Compression via Triangulation, Computer Science, (Sep. 7, 2018), pp. 405-409.

* cited by examiner

$i=0$ ; $C=0$ ; $K_0 = \emptyset$ $i=1$ ; $C=1$ ; $K_1 = \{C_1 = \{V_1\}\}$ $i=2$ ; $C=2$ ; $K_2 = \{C_1 = \{V_1\}; C_2 = \{V_2\}\}$ ⟶ $U\{V_2\}$ <u>Case a</u>

$i=3$ ; $C=2$ ; $K_3 = \{C_1 = \{V_1, V_3\}; C_2 = \{V_2\}\}$ ⟶ $U\{V_3\}$ <u>Case b</u>

$i=4$ ; $C=2$ ; $K_4 = \{C_1 = \{V_1, V_3\}; C_2 = \{V_2, V_4\}\}$ ⟶ $U\{V_4\}$ <u>Case b</u>

$i=5$ ; $C=2$ ; $K_5 = \{C_1 = \{V_1, V_3\}; C_2 = \{V_2, V_4, V_5\}\}$ ⟶ $U\{V_5\}$ <u>Case b</u>

$i=6$ ; $C=3$ ; $K_6 = \{C_1 = \{V_1, V_3\}; C_2 = \{V_2, V_4, V_5\}; C_3 = \{V_6\}\}$ ⟶ $U\{V_6\}$ <u>Case a</u>

$i=7$ ; $C=3$ ; $K_7 = \{C_1 = \{V_1, V_3, V_4\}; C_2 = \{V_2, V_4, V_5\}; C_3 = \{V_6\}\}$ ⟶ $U\{V_7\}$ <u>Case b</u>

$i=8$ ; $C=3$ ; $K_8 = \{C_1 = \{V_1, V_3, V_4\}; C_2 = \{V_2, V_4, V_5, V_8\}; C_3 = \{V_6\}\}$ ⟶ $U\{V_8\}$ <u>Case b</u>

$i=9$ ; $C=2$ $K_9 = \{C_1 = \{V_1, V_3, V_4\}; C_2 = \{V_2, V_4, V_5, V_8, V_6, V_9\}\}$ ⟶ $U\{V_9\}$ <u>Case c</u>

$V_{ic} = V_2$
$V_{id} = V_9$

⟶ $U\{V_{10}\}$ <u>Case c</u>

$i=10$ ; $C=1$ ; $K_{10} = \{C_1 = \{V_1, V_2 \ldots V_{10}\}\}$ $V_{ic} = V_1$
$V_{id} = V_{10}$

FIG. 6

$$Gx = \begin{matrix} -1 & 0 & 1 \\ -2 & 0 & 2 \\ -1 & 0 & 1 \end{matrix}$$

METHOD FOR ENCODING A DIGITAL IMAGE IN ORDER TO COMPRESS SAME

CROSS-REFERENCE TO RELATED APPLICATIONS

This application is a national phase entry under 35 U.S.C. § 371 of International Patent Application PCT/FR2020/052464, filed Dec. 16, 2020, designating the United States of America and published as International Patent Publication WO 2021/123617 A1 on Jun. 24, 2021, which claims the benefit under Article 8 of the Patent Cooperation Treaty to French Patent Application Serial No. FR1914826, filed Dec. 19, 2019.

TECHNICAL FIELD

The present disclosure relates to a method for encoding a digital image, or a sequence of digital images, for the compression thereof.

BACKGROUND

For the sake of clarity, it is recalled that a raw image is usually represented digitally by data called "pixels" arranged in matrices, therefore, along a width and a length of the image, each pixel associating a point of the image with at least one value of gray level or color intensity (generically referred to as color intensity in the following description). This representation of a raw image is not economical in terms of quantity of data, and it is often desired to encode this raw image in order to represent it digitally in a more compact data format, for example, for the storage or transmission thereof.

Known methods for encoding digital images are based on a combination of techniques that operate on an image ("intra-frame encoding") and on the relationships that exist between several successive images ("inter-frame encoding").

These techniques usually decompose a digital image into macroblocks of pixels, apply representation space transformations to these macroblocks, such as Fourier, wavelet or discrete cosine transformations, in order to retain only the perceptually significant coefficients.

The document "Representing image in 200 bytes: compression via triangulation" by D. Marwood et al., IEEE ICIP 2018, (arXiv:1809.02257) offers another encoding approach where a digital image is broken down into triangles. The vertex of each triangle corresponds to a pixel of the original raw image from which it inherits the color intensity. By exploiting the properties of a standard tiling of the image, for example, by a Delaunay triangulation, the encoded image can be simply represented by the list of vertices. During decoding, the image can be recomposed, pixel by pixel, by interpolation of the color intensity between the vertices of the triangles, these having been reconstituted from the list of vertices. The problem in this approach is to choose the number of triangles and to position the vertices of the triangles in order, at a given compression rate, to minimize the degradation of the reconstituted image with respect to the original raw image.

It is noted that encoding by triangulation of an image is particularly advantageous when this image is intended to be decoded by a modern computer. This computer effectively has a graphics card or chip that is designed to process triangles very efficiently in a pipeline in order to reconstruct images. From this point of view, a triangulation decoding method can be implemented very easily and efficiently.

Intuitively, it is understood that according to this encoding approach, placing a greater density of triangles in the richest areas of the image is sought, in order to be able to recompose the image in these areas with greater finesse. Pragmatically, the aforementioned article proposes several methods, systematic or stochastic, for encoding a digital image by triangulation for the compression thereof.

An alternative method of encoding by triangulation of a digital image is disclosed, which is based on the principles of algorithmic topology. This scientific and technical branch has been the subject of numerous publications, and reference can, for example, be made to the work "*Computational Topology: An Introduction*" by H. Edelsbrunner and J. Harer, AMS Press, 2009.

BRIEF SUMMARY

In order to achieve one of these aims, the object of the disclosure proposes a method for encoding a digital image for the compression thereof, the digital image being defined as a point cloud associating a set of N pixels, designated as vertices, with a scalar intensity value, the method aiming to establish triangulation vertices of the digital image and comprising the following steps:

in a first step, forming a filtration of the point cloud composed of a series of M simplicial complexes, each simplicial complex corresponding to a data structure associating a plurality of vertices with each other, the filtration being such that the plurality of vertices associated by a simplicial complex having a determined rank are also associated in the simplicial complexes respectively having ranks higher than the determined rank;

in a second step, processing at least part of the simplicial complexes to identify persistence pairs respectively associated with topological structures of the filtration, each persistence pair being composed of a first vertex associated with the creation of the topological structure in the filtration, and a second vertex associated with the disappearance of the topological structure in the filtration;

in a decimation step, calculating, for each persistence pair identified, the lifetime of the topological structure associated with the persistence pair and retaining, in a restricted list, some of the persistence pairs having the longest lifetimes;

defining the triangulation vertices as all the vertices that make up the persistence pairs in the restricted list.

According to other advantageous and non-limiting features of the disclosure, taken individually or in any technically feasible combination:

the first step comprises ordering the N vertices in increasing order of scalar intensity value in a vertex table;

the ordering step comprises applying a discrimination rule so as to order, in the table, two vertices having the same scalar intensity value;

during the first step, an iteration index i and a class index c are initialized to 0, a starting simplicial complex is initialized to the empty set and the sequence of the following operations is repeated until the iteration index i reaches N:

incrementing the iteration index i;
extracting the vertex of rank i from the vertex table and checking whether the vertex of rank i is in the neighborhood of a vertex comprised in the simplicial complex of rank i−1; and
   if no vertex of the simplicial complex of rank i is in the neighborhood of the vertex of rank i, incrementing the rank of class c, forming the simplicial complex of rank i by adding a new class composed of the vertex of rank i to the simplicial complex of rank i−1, and assigning rank c to the new class;
   if at least one vertex of a single class of the simplicial complex of rank i is in the neighborhood of the vertex of rank i, forming the simplicial complex of rank i by adding the vertex of rank i to the simplicial complex of rank i−1 in this one class;
   if several vertices of a plurality of classes of the simplicial complex of rank i are in the neighborhood of the vertex of rank i, forming the simplicial complex of rank i by grouping together, in the simplicial complex of rank i−1, the vertices forming this plurality of classes and the vertex of rank i in the class of lowest rank;
during the first step, an iteration index i to N+1 and a class index c are initialized to 0, a starting simplicial complex is initialized to the empty set and the sequence of the following operations is repeated until the iteration index i reaches 1:
decrementing the iteration index i;
extracting the vertex of rank i from the vertex table and checking whether the vertex of rank i is in the neighborhood of a vertex comprised in the simplicial complex of rank i+1; and
   if no vertex of the simplicial complex of rank i+1 is in the neighborhood of the vertex of rank i, incrementing the rank of class c, forming the simplicial complex of rank i by adding a new class composed of the vertex of rank i to the simplicial complex of rank i+1, and assigning rank c to the new class;
   if at least one vertex of a single class of the simplicial complex of rank i+1 is in the neighborhood of the vertex of rank i, forming the simplicial complex of rank i by adding the vertex of rank i to the simplicial complex of rank i+1 in this one class;
   if several vertices of a plurality of classes of the simplicial complex of rank i+1 are in the neighborhood of the vertex of rank i, forming the simplicial complex of rank i by grouping together, in the simplicial complex of rank i+1, the vertices forming this plurality of classes and the vertex of rank i in the class of lowest rank;
in the case where the vertices forming a plurality of classes are grouped together in the class with the lowest rank, the second step consists in forming a persistence pair comprising:
   the first vertex corresponding to the lowest rank vertex in the lowest rank class, this rank being called the appearance rank of the persistence pair;
   the second vertex corresponding to the vertex of rank of index i, this rank i being called the disappearance rank of the persistence pair;
the lifetime of the topological structure associated with a persistence pair is calculated as the difference between the disappearance rank of the persistence pair and the appearance rank of the persistence pair;
a first vertex $v_1$, corresponding to a point with indices $i_1$, $j_1$ of the digital image, is in the neighborhood of a second vertex $v_2$, corresponding to a point with indices $i_2$, $j_2$ of the digital image, if $i_1=i_2+1$ and/or if $j_1=j_2+1$;
the scalar intensity value of the digital image results from the combination of a plurality of color intensities of a raw color image;
the method further comprises determining a plurality of triangles from triangulation vertices;
during the first step, a "Lower Star" filtration is formed.

According to another aspect, a computer program is disclosed herein comprising instructions suitable for implementing each of the steps of the encoding method that has just been presented, when the program is executed on a computer.

According to yet another aspect, an encoder is disclosed that is configured to implement the encoding method.

BRIEF DESCRIPTION OF THE DRAWINGS

Other features and advantages of embodiments of the disclosure will become apparent from the detailed description that follows with reference to the accompanying figures, in which.

DETAILED DESCRIPTION

A method is disclosed for encoding a digital image for the compression thereof. More specifically, the encoding aims to establish triangulation data of the image and, to this end, implements the principles of algorithmic topology and, in particular, the technique of persistent homology.

Before going into the detail of this method, it is specified that it is intended to be implemented by an encoder, which can be hardware or software.

Figure 1:
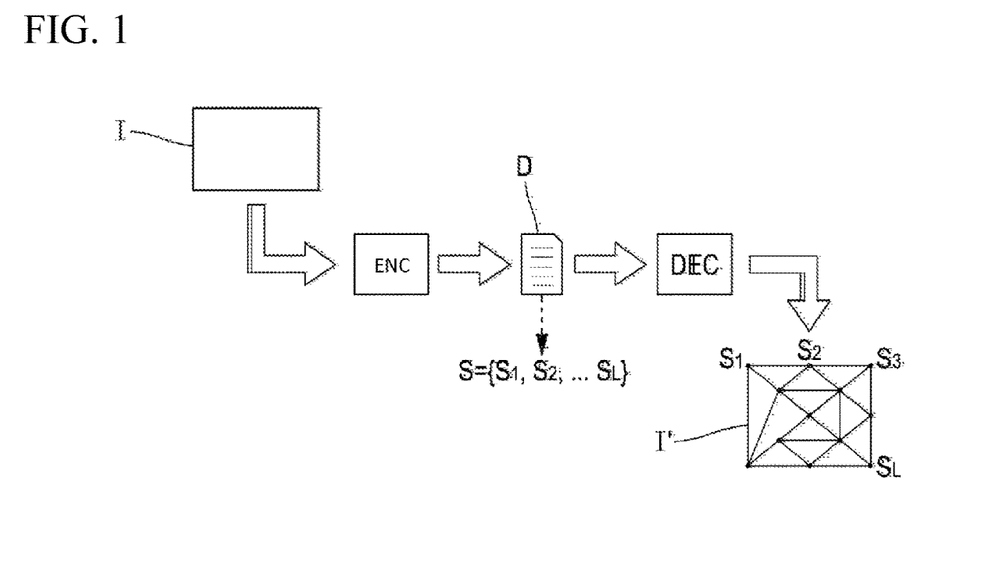
FIG. 1 shows the context of a method according to the disclosure.

As shown in FIG. 1, the encoder ENC is supplied with a raw digital image I, in the form of a matrix of pixels. This raw digital image I can be defined in gray level or in color, and each pixel then comprises the digital gray level data or the digital color intensity data, for example, in RGB, as is well known per se.

The encoder ENC outputs triangulation data D, represented here in the form of a computer file. It can be a list of triangles respectively defined by the coordinates of the three vertices in the original raw image I (for example, in pixel index i,j), each vertex being associated with the digital color intensity data (or with the digital gray level data). Advantageously, however, the encoder relies on a standard tiling, for example, a Delaunay triangulation, and the triangulation data can then simply be formed from the list S of vertices $\{s_1, s_2, \ldots, s_L\}$ as shown in FIG. 1, associated with digital color intensity data.

The triangulation data D may itself undergo digital data compression encoding, for example, lossless encoding of the ANS (Asymmetric Numeral System) type. This operation (not shown in FIG. 1) can be carried out by the encoder ENC or by another device or program. Whether or not these data D have been compressed, they represent the encoded (that is to say, compressed) version of the original raw image I. This version can be contained in a computer file to be recorded on a computer medium or transmitted directly via a network.

To exploit the encoded image, the triangulation data is supplied to a decoder DEC, which, similarly to the encoder ENC, can assume a hardware or software form. If necessary, this decoder performs the decompression of the digital data received to restore the triangulation data D. When these data D consist of a simple list S of vertices $\{s_1, s_2, \ldots, s_L\}$, the DEC decoder reconstructs these triangles according to the selected tiling method, a Delaunay triangulation in the example taken above.

To reconstitute an image I', the decoder DEC recalculates each of its pixels by interpolation from the triangles reconstituted from the list S of vertices $\{s_1, s_2, \ldots, s_L\}$ and the digital color intensity data associated with each of these vertices.

General Principle of the Encoding Method

Figure 2:
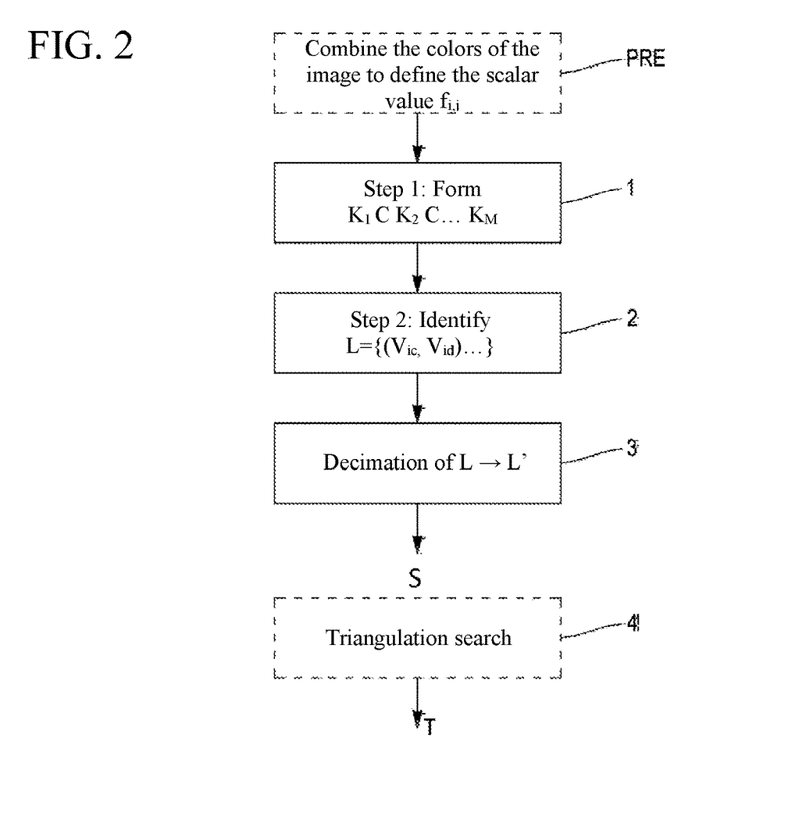
FIG. 2 shows the main steps of a method according to the disclosure.

As specified in the introduction of this application, an alternative method of encoding by triangulation of a digital image I is disclosed, which is based on the principles of algorithmic topology. The steps of this method are shown in FIG. 2.

In such an approach, the digital image I is seen as a point cloud (i, j, $f_{ij}$) associating the N pixels of indices (i, j) of the image with a scalar intensity value $f_{ij}$.

This intensity can be a gray level or a luminance level. When the original raw image I is in color, for example, with three color levels defined by RGB components for each pixel $p_{ij}$, this image can be processed, during a preliminary processing step PRE, in order to combine the values according to the RGB components and to associate, with the pixel $p_{ij}$, a scalar value, called scalar intensity value $f_{ij}$ in this application. Preferably, this combination ensures that two close colors in the original raw image I are transformed into equally close scalar intensity values. A detailed example of such a combination will be given later in the application.

In the remainder of this description, the points of the image will be referred to as vertices, in order to conform to the terminology generally employed in the field of algorithmic topology.

In a first step 1 of an encoding method according to the disclosure, a filtration of the point cloud is formed. This filtration is composed of a series of simplicial complexes $K_i$, each simplicial complex corresponding to a data structure associating a plurality of vertices $v_k$ with one another.

By definition, in a filtration, the simplicial complexes are ordered relative to one another, such that a complex of rank i is included in the complexes of ranks greater than i. In other words, the vertices $v_k$ associated with each other in a simplicial complex $K_i$ having a determined rank i are also associated with each other in the simplicial complexes respectively having ranks higher than the determined rank i.

Using a filtration, the digital image I to be encoded (the point cloud) can be decomposed into subsets of the clouds included in each other. This decomposition can be done in many ways. This may be, for example, a so-called "Lower Star" filtration, a particularly easy-to-implement example of which will be given in a second part of this description. However, this decomposition is not arbitrary, and it must ensure that each subset presents the properties of a simplicial complex in order to be able to take advantage of the tools that are available in the field of algorithmic topology. It may thus be a Cech filtration or a Vietoris-Rips filtration.

In a second step 2 of an encoding method, the aim is to identify and characterize topological structures within the filtration. These topological structures, in the case of an image and, therefore, in the three-dimensional universe of the point cloud, can, for example, correspond to a connected component, i.e., a cluster of points in the cloud, or to a hole, i.e., an absence of points in a particular area of the cloud.

It is thus sought to determine, in the filtration, the rank from which such topological structures appear and the rank from which these structures disappear. It is also sought to determine the appearance and disappearance vertices of these structures in the filtration. The idea underlying this analysis is that a topological structure that exhibits a relatively long lifetime in the filtration (i.e., the difference between its appearance and disappearance ranks in the filtration is relatively large) is a remarkable topological structure, which "structures" the image. This topological structure can be approximated efficiently during the decoding phase, by interpolation between the vertices transmitted. Conversely, a topological structure having a relatively short lifetime in the filtration is a topological structure of less significance, a detail of the image.

One of the principles underlying the encoding method of the disclosure is to retain only the remarkable topological structures so as to provide a compressed version of the digital image I. Topological structures of less significance can be omitted without excessively degrading the perceived quality of the image.

To carry out this analysis, during a second step 2, a method according to the disclosure processes at least part of the simplicial complexes $K_i$ in order to identify persistence pairs $(v_{ic}, v_{id})$, and to form a list L of persistence pairs $\{(v_{ic}, v_{id}), \ldots\}$. A persistence pair corresponds to a pair of vertices composed of a first and a second vertex $v_{ic}, v_{id}$, the first vertex $v_{ic}$ corresponding to the vertex at which a structure appears in the filtration and the second vertex $v_{id}$ of the pair corresponding to the vertex at which the topological structure disappears in the filtration.

The lifetime of this persistence pair $(v_{ic}, v_{id})$ corresponds to the difference between the rank ic of the simplicial complex $K_{ic}$ in which the topological structure appears and the rank id of the simplicial complex $K_{id}$ in which the topological structure disappears.

The method according to the disclosure uses the filtration persistence pairs identified during the second step 2, during a so-called decimation step 3.

During this step, for each persistence pair $(v_{ic}, v_{id})$ identified in the filtration during the second step 2, the lifetime of the topological structure is calculated, that is to say, the difference in rank is calculated between the rank id of the second vertex via and the rank ic of the first vertex $v_{ic}$. And only a part of the persistence pairs from the list L created during the second step 2 is retained in a restricted list L', this part being composed of pairs having the longest lifetimes.

The selection of persistence pairs according to this criterion can be done in multiple ways. It is, for example, possible to choose to retain a predetermined number of pairs, the "P" pairs with the longest lifetimes. Alternatively, it is possible to choose to retain a predetermined percentage of these pairs, the "P %" of pairs having the longest lifetime.

It is also possible to choose the pairs having a lifetime greater than a predetermined threshold.

According to the disclosure, the persistence pairs retained in the restricted list L', that is to say, the appearance vertices $v_{ic}$ and the disappearance vertices via of the persistence pairs that constitute the restricted list L', form the triangulation vertices S. Of course, the more severe the decimation step, i.e., the smaller the number of persistence pairs retained in the restricted list L', the greater the image compression rate, of course to the detriment of the perceived quality of the reconstructed image.

In other words, the disclosure retains as triangulation vertices $\{s_1, s_2, \ldots, s_L\}$ of an image I, the appearance $v_{ic}$ and disappearance via vertices of the topological structures having the longest lifetimes in the filtration.

As has already been said, these topological structures are those that best structurally define the image, and the disclosure, therefore, retains the appearance and disappearance vertices of these structures as triangulation vertices.

To encode the image I for the compression thereof, a computer file D, therefore, contains only the pixels $p_{ij}$ of the original raw image I corresponding to the triangulation vertices S retained, that is to say, the indices i, j and the intensity level $p_{ij}$ of these pixels. This file D can be recorded on a medium or transmitted directly.

As mentioned previously, this computer file D may be sufficient on its own, and the decoder DEC will construct the triangles from the list S of vertices provided, according to a pre-established or arbitrarily chosen protocol. It can thus be a Delaunay triangulation. Alternatively, the file D may comprise a section designating the triangulation method to be employed.

One can also choose to add pixels arbitrarily in the file D to favor a homogeneous or regular triangulation of the image: one can thus choose to add the pixels forming the 4 corners of the image I, or pixels distributed over the perimeter of the image I or even as a grid on the image.

Alternatively again, the method may comprise an additional step 4 of searching for a triangulation from the selected vertices S. Indeed, there are very many ways to form triangles from a simple list S of vertices. Some of these solutions do not necessarily lead to a high-quality reconstituted image I', or do not necessarily lead to a reasonable decoding processing time. It is, therefore, possible in some cases to provide a triangulation step 4 on the encoder side seeking to establish a list of triangles T or information allowing such a list to be established, leading to a satisfactory image quality or decoding speed.

In the most complete case, this triangulation step 4 of a method according to the disclosure provides a list T of triangles with a favorable triangulation (in processing time, in image quality) and the compressed file D of the image is then made up of triangles defined by their vertex pixels i.e., the vertex coordinates and color information).

Alternatively, the triangulation step 4 establishes a parameter of a triangulation method known to the decoder, and the computer file D of the compressed image then contains the value of this parameter so that it can be used by the decoder DEC.

In another variant, the triangulation step 4 provides a summary indication that can be used on the decoder DEC side to guide this triangle reconstruction work. It may, for example, be a matter of recommending to the decoder DEC to form a predetermined number of triangles, independently of the triangulation method implemented.

DETAILED EXAMPLE

A detailed example of the method of encoding an image I follows, which was presented earlier in a general manner. This example also forms a preferred embodiment of this method.

Figure 3A:
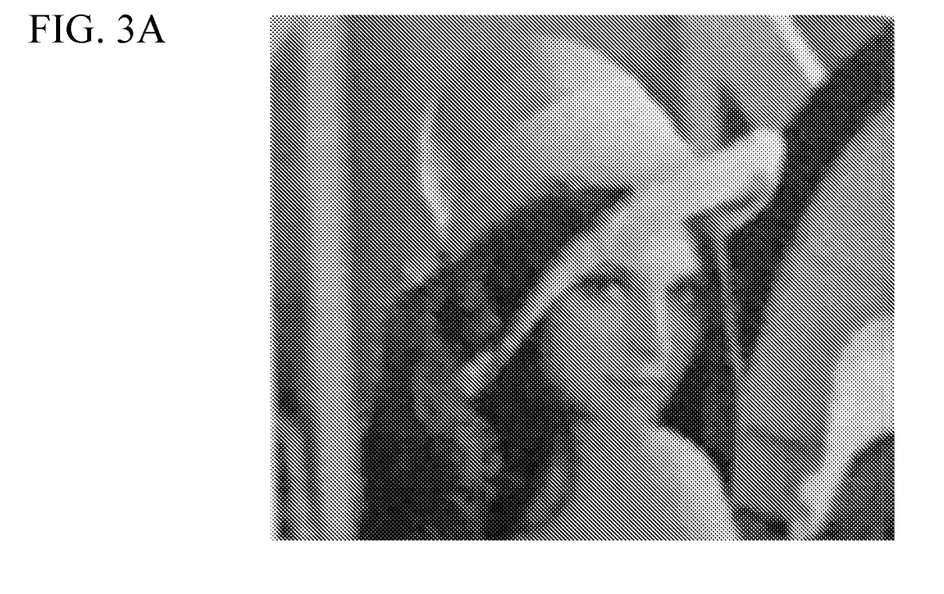
FIGS. 3A through 3D respectively show an original raw image, the vertices in this image chosen in an intermediate step of a method according to the disclosure, the vertices chosen in this image at the end of the decimation step, and a recomposed image from these vertices.

An RGB color image shown in FIG. 3A is available, here an image having a resolution of 220 pixels in height and 220 pixels in width. Each of the 48,400 pixels is, therefore, associated with a vector formed by three levels of red, green and blue, respectively. The method could quite naturally be applied to a color image encoded in a color space other than the RGB space chosen here.

Scalar Intensity Value

Figure 6:
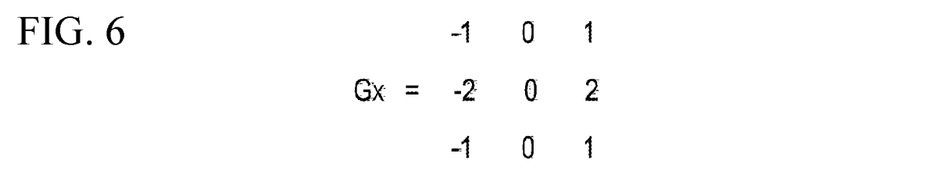
FIG. 6 shows the matrix Gx of a Sobel filter.

To define a scalar value $f_{ij}$ at each pixel $p_{ij}$ of the image, a first Sobel filter Gx is applied to the image, the filter being defined by the matrix of FIG. 6.

The filter is applied to the color vectors of the image pixels and, therefore, provides a new vector for each pixel $p_{ij}$, from the color vector of the adjacent pixels $p_{i-1j}$ and $p_{i+1j}$.

A second Sobel filter $G_y$ is similarly applied, which is defined by the transposed matrix of $G_x$ that is applied to the color vectors of the pixel $p_{ij}$ and of its adjacent pixels according to the index j.

The scalar value $f_{ij}$ associated with a pixel $p_{ij}$ is defined by the sum of the square norm of the vector $Gx\cdot(p_{i-1j}, p_{ij}, p_{i+1j})$ and the square norm of the vector $Gy\cdot(p_{ij-1}, p_{ij}, p_{ij+1})$ associated with the pixel $p_{ij}$:

$$f_{ij} = \operatorname{norm}(Gx\cdot(p_{i-1j},p_{ij},p_{i+1j}))^2 + \operatorname{norm}(Gy\cdot(p_{ij-1},p_{ij},p_{ij+1}))^2$$

Order of Vertices in a Vertex Table

Vertex v now denotes the 48,400 pixels $p_{ij}$ of the image. Each vertex v can, therefore, be associated with a scalar quantity of intensity $f_{ij}$, to form a point cloud. A table of the 48,400 vertices is formed, by ordering these vertices v in the table in ascending order of their scalar intensity values $f_{ij}$.

It is of course possible for two vertices $v_k$, $v_{k'}$ to have identical intensity values. In this case, the following rule can be applied: the vertex $v_k$ associated with a pixel $p_{ij}$ of index i and j is positioned in the vertex table upstream of a vertex $v_{k'}$ associated with a pixel $p_{i'j'}$ of index i' and j', if i<i' or, in the case where i=i', if j<j'. Otherwise, the vertex $v_{k'}$ is positioned upstream of the pixel $v_k$ in the vertex table. Any other ordering rule may of course be suitable.

Consequently, in the vertex table, a vertex of rank k, denoted $v_k$, is associated with a scalar intensity value $f_k$ less than or equal to the scalar intensity value $f_{k'}$ of a vertex $v_{k'}$ of rank k' greater than rank k.

Neighborhood of a Vertex

The filtering algorithm of the present example uses a neighborhood relation of a vertex that can be defined freely while being compatible with the objects used in the algorithmic topology and, in particular, the simplicial complexes. This neighborhood forms an equivalence relation on the set formed from the vertex table.

Figure 4:
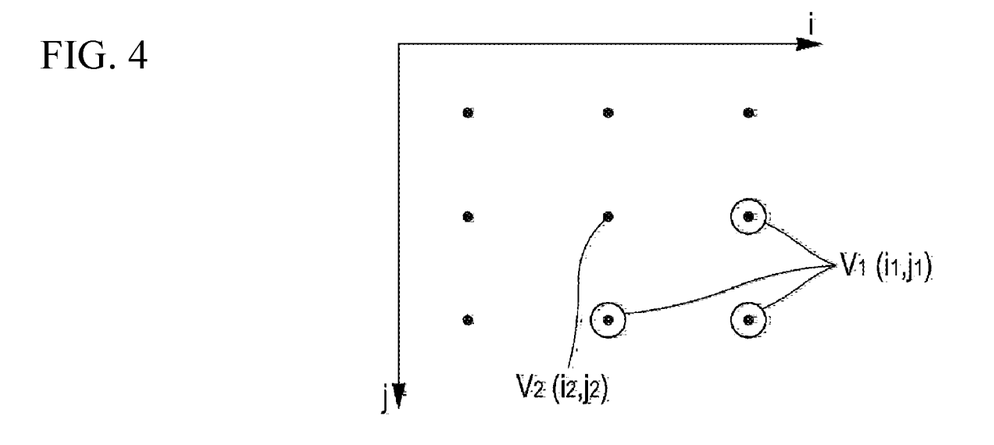
FIG. 4 shows a neighborhood relationship used in an embodiment of a filtration step of a method according to this disclosure.

In the case of this preferred embodiment, a first vertex $v_1$, corresponding to a pixel of indices i1, j1 of the digital image, is in the neighborhood of a second vertex $v_2$, corresponding to a pixel of indices i2, j2 of the digital image, if i1=i2+1 and/or if j1=j2+1. This neighborhood relation is illustrated in FIG. 4.

Filtration

It will be recalled that filtration aims to form a series of simplicial complexes $K_i$, each simplicial complex $K_i$ corresponding to a data structure associating a plurality of vertices v with one another. In the preferred embodiment, the filtration is a "Lower Star" filtration and as many simplicial complexes $K_i$ are constructed as there are vertices in the vertex table i.e., as many as the number of pixels N in the image). This filtration has the advantage of being linear in computational complexity with the number of points in the cloud. It avoids building the simplicial complex of the point cloud itself, and establishes the simplicial complexes of the filtration directly. It naturally brings out the topological invariants associated with the simplicial complexes of the filtration. Each simplicial complex $K_i$ is composed of at least one class C, each class C grouping together vertices linked together by the neighborhood relation. They are, therefore, equivalence classes.

In an initialization phase of this first filtration step of the method, an iteration index i and a class index c are initialized to 0, a starting simplicial complex $K_0$ is initialized to an empty set.

Then, the sequence of the following operations is repeated until the iteration index i reaches the number of vertices, here 48,400:
incrementing the iteration index i;
extracting the vertex vi of rank i from the vertex table and checking whether this vertex of rank i is in the neighborhood of a vertex comprised in the simplicial complex $K_{i-1}$ of rank i−1.

These vertices of the simplicial complex $K_{i-1}$ are identified in the neighborhood of the vertex $v_i$, and depending on the case, the simplicial complex $K_i$ of rank i is defined as follows:
case a: if no vertex of the simplicial complex $K_i$ of rank i is in the neighborhood of the vertex vi of rank i, the rank of class c is then incremented, and the simplicial complex $K_i$ of rank i is formed by adding, to the simplicial complex $K_{i-1}$ of rank i−1, a new class C composed of the vertex vi of rank i. Rank c is assigned to this new class C.
case b: if at least one vertex of a single class of the simplicial complex $K_i$ of rank i is in the neighborhood of the vertex vi of rank i, the simplicial complex $K_i$ of rank i is formed by adding the vertex $v_i$ of rank i to the simplicial complex $K_{i-1}$ of rank i−1 in this one class;
case c: finally, if several vertices of a plurality of classes of the simplicial complex $K_i$ of rank i are in the neighborhood of the vertex vi of rank i, the simplicial complex Ki of rank i is formed by grouping together, in the simplicial complex $K_{i-1}$ of rank i−1, the vertices forming this plurality of classes and the vertex $v_i$ of rank i in the class of lowest rank. The rank of class c is then decremented to reflect the disappearance of the class (or classes).

Note that each simplicial complex is composed of at least one class, and generally of a plurality of classes. These classes group together the vertices linked by the neighborhood relation. Two classes of vertices group together vertices that are distinct from each other, each of these classes forming a kind of topological structure of connected component type. The number of classes in a simplicial complex gives, in terms of algorithmic topology, the Betti number of order 0, that is to say, a topological invariant.

Second Step of Establishing Persistence Pairs

From the filtration just constructed, persistence pairs can easily be determined as follows.

With continued reference to case c mentioned above, on the occasion of an iteration of index i, the vertices forming a plurality of classes have been grouped together in the class of the lowest rank of this plurality.

A persistence pair can then be established as the pair formed by:
the first vertex $v_{ic}$ corresponding to the lowest rank vertex in the lowest rank class, this rank being called the appearance rank ic of the persistence pair;
the second vertex $v_{id}$ corresponding to the vertex of rank of index i, this rank i being called the disappearance rank id of the persistence pair.

A persistence pair, therefore, corresponds to the pair of vertices comprising the first vertex $v_{ic}$ at which a topological structure (a class) is created in the filtration, and comprising the second vertex $v_{id}$ at which this topological structure (a class) disappears in the filtration.

The persistence pairs can be established at the end of the first step leading to the creation of the filtration, but more simply they can be established at each iteration of the sequence making up this first step, insofar as case c occurs.

Figure 5:
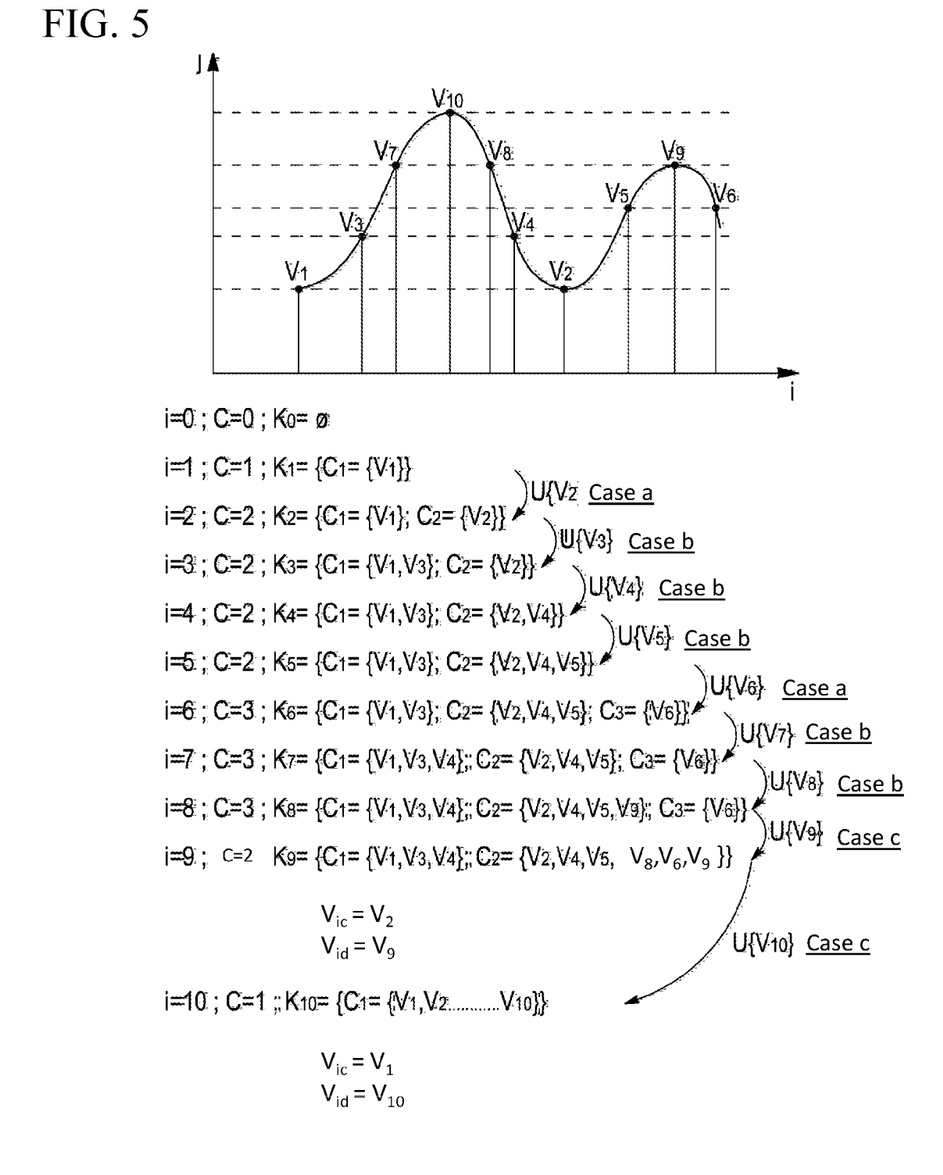
FIG. 5 shows a sequence of steps resulting from the application, on a simplified image, of a particular example of an encoding method according to the disclosure.

By way of illustration of these mechanisms, FIG. 5 shows a one-dimensional image made up of 10 pixels, thus forming 10 vertices ordered by increasing magnitude of their intensity value f from $v_1$ to $v_{10}$.

In the list under the simplified image of this figure, the algorithm presented has been run from the initialization step for which i=0, up to a terminal step for which i=10.

At each iteration i, the vertex according to one of cases a, b or c described above is added to the simplicial complex Ki.

It has been observed that up to iteration 8, new classes $c_1$, $c_2$, $c_3$ were created using the vertices $v_i$, or this vertex was added to a pre-existing class according to one of case a or case b.

At iteration 9, vertex $v_9$, in the neighborhood of vertices $v_5$ and $v_6$, contained in classes $c_2$ and $c_3$, respectively, leads to the execution of case c of the first step. Classes $c_2$ and $c_3$ merge within class $c_2$, in which vertex $v_9$ is also added. The disappearance of a class leads to the execution of the second step of the method, and to the creation of a persistence pair whose first vertex is $v_2$ (creation of the class with the lowest rank 2) and whose second vertex is $v_9$ (disappearance of class $c_3$). The lifetime of the associated topological structure is, therefore, 7.

The same phenomenon is repeated during the last iteration.

Figure 3B:
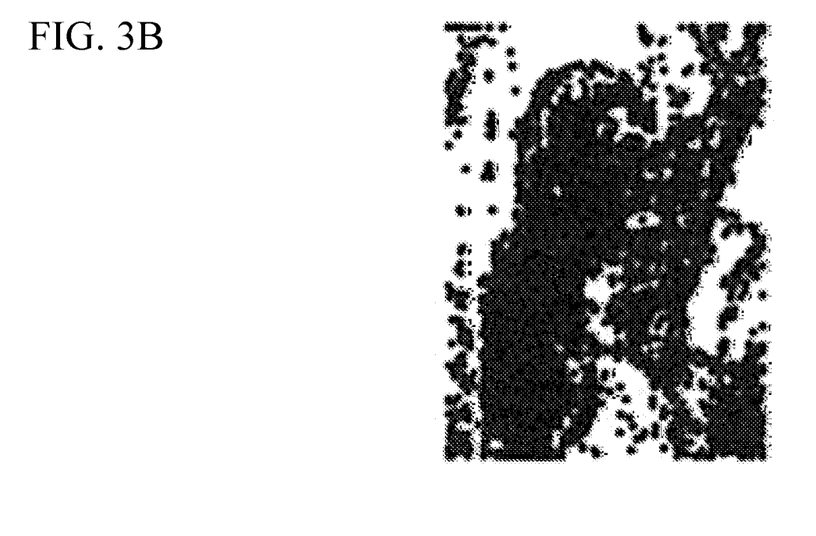

Returning to the general description of the processing carried out on the digital image of FIG. 3A, the processing carried out during the first and second steps that have just been presented leads to determining a list of persistence pairs, which define vertices of interest in this image. FIG. 3B shows the position of these vertices, of which there can be several thousand, in the image plane.

Decimation Step

This step requires determining the lifetime of a topological structure. This lifetime is associated with a persistence pair $(v_{ic}, v_{id})$ and is calculated as the difference between the disappearance rank id of the persistence pair and the appearance rank ic of the persistence pair.

As indicated in the general description of the disclosure, this lifetime is determined for each persistence pair. Then, some of the persistence pairs exhibiting the longest lifetimes are retained in the restricted list. In this example embodiment, about 11% of the pairs whose lifetime is the longest have been retained.

Figure 3C:
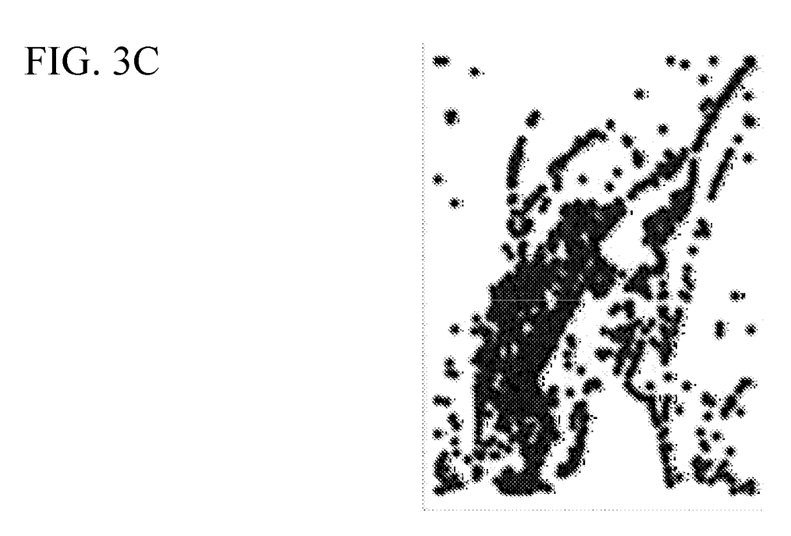

Triangulation vertices are defined as all the vertices that make up the persistence pairs in the restricted list. FIG. 3C shows the position of these vertices in the image plane. In this example, these triangulation vertices form the data supplied by the encoder, after they have been associated with the RGB color data of the pixel $p_{ij}$ to which these vertices correspond. FIG. 3E illustrates an example of triangulation, which can be carried out by the decoder DEC from the vertices supplied to it.

An advantageous variant of this preferred embodiment is now presented. It will first be noted that this embodiment allows identification of the topological structures of connected components type, but does not allow identification of those of the hole type. To compensate for this, the method provides for repeating the first step of filtration and the second step of determining the persistence pairs, taking the opposite of the scalar intensity values $-f_{ij}$ associated with each vertex. It can be shown that in this way, it is possible to identify topological structures of the hole type.

More precisely, it suffices to repeat the steps presented above, going through the vertex table in a descending manner, and to arrive at the following sequence:

In an initialization phase, the iteration index i is initialized to N+1 and the class index c to 0. A starting simplicial complex $K_N$ is initialized to the empty set.

Then, the sequence of the following operations is repeated until the iteration index i reaches 1:

decrementing the iteration index i;

Extracting the vertex $v_i$ of rank i from the vertex table and checking whether the vertex $v_i$ of rank i is in the neighborhood of a vertex comprised in the simplicial complex $K_{i+1}$ of rank i+1.

These vertices of the simplicial complex $K_{i+1}$ are identified in the neighborhood of the vertex $v_i$, and depending on the case, the simplicial complex $K_i$ of rank i is defined as follows:

Case a': if no vertex of the simplicial complex $K_{i+1}$ of rank i+1 is in the neighborhood of the vertex $v_i$ of rank i, the rank of class c is incremented, and the simplicial complex $K_i$ of rank i is formed by adding a new class Cc composed of the vertex $v_i$ of rank i to the simplicial complex $K_{i+1}$ of rank i+1 and this new class Cc is assigned rank c.

Case b': if at least one vertex of a single class of the simplicial complex $K_{i+1}$ of rank i+1 is in the neighborhood of the vertex $v_i$ of rank i, the simplicial complex Ki of rank i is formed by adding the vertex vi of rank i to the simplicial complex $K_{i+1}$ of rank i+1 in this one class.

Case c': if several vertices of a plurality of classes of the simplicial complex $K_{i+1}$ of rank i+1 are in the neighborhood of the vertex $v_i$ of rank i, the simplicial complex $K_i$ of rank i is formed by grouping together, in the simplicial complex $K_{i+1}$ of rank i+1, the vertices forming this plurality of classes and the vertex $v_i$ of rank i in the class of lowest rank. The rank of class c is decremented to reflect the disappearance of a class.

Similar to what was explained previously, this last case c' can be followed by the second step aiming at establishing the persistence pairs. These persistence pairs determined during this "inverse" calculation sequence are grouped together with the pairs identified during the "direct" calculation sequence presented previously, to form the table of persistence pairs subjected to the decimation step. The chain of these two calculation sequences does not represent any favored order, and the "inverse" calculation sequence could naturally be preceded by the "direct" calculation sequence.

Figure 3D:
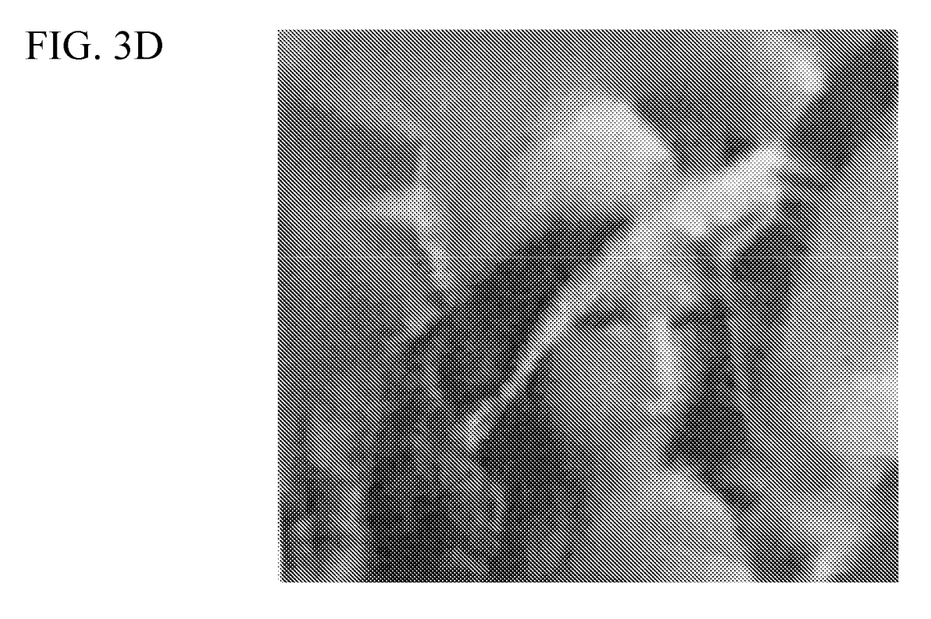
Figure 3E:
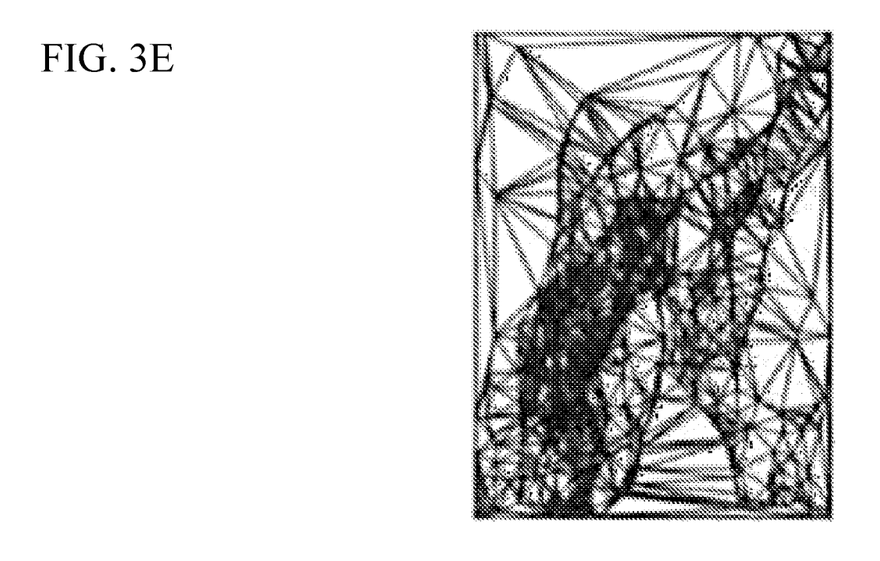
FIG. 3E shows an example of a triangulation that can be performed by an encoder from the vertices of FIG. 3C.

To complete the description of this example, FIG. 3D shows the image I' reconstituted by a decoder, by interpolation between the pixels corresponding to the vertices transmitted.

An encoding method according to the disclosure can be implemented by a hardware device (an encoder) or by software. In the case of software, the method is implemented by a computer, via a computer program consisting of instructions adapted to implement at least each of the steps of this method.

When the encoding method is implemented by computer, the method organizes the data manipulated by the program instructions in the form of computer data structures, which have been designated in the present application by the expressions "table" or "list." Of course, these designations are not intended to limit how the data is actually organized by the computer program. "Table" or "list" means, therefore, any data structure allowing access to data recorded in a storage space of the computer. The person skilled in the art can choose the data structure according to the need or the computing environment available to him. It may thus consist of graphs, matrices, lists and/or tables allowing direct access to a data item or access to a pointer to this data item.

As will be readily understood, the disclosure is not limited to the described embodiment, and it is possible to add variants thereto without departing from the scope of the invention as defined by the claims.

In particular, it will be possible to choose to apply an encoding method according to the disclosure on a complete image as was presented in the previous detailed example, but alternatively this encoding may be carried out on macroblocks of the image, for example, 32 pixels by 32 pixels. This approach has the advantage of allowing the parallelization of the encoding processing of the macroblocks and, therefore, of reducing the total processing time.

The invention claimed is:

1. A method for encoding a digital image formed by a set of N pixels ($p_{ij}$) for compression thereof, the digital image being defined as a cloud of N points (i, j, $f_{ij}$), designated as vertices ($v_k$), associating the set of N pixels ($p_{ij}$) with a scalar intensity value ($f_{ij}$), the method comprising the following steps:

a) ordering N vertices ($v_k$) in increasing order of scalar intensity values ($f_{ij}$) in a vertex table, wherein the ordering step comprises applying a discrimination rule so as to order, in the vertex table, two vertices having the same scalar intensity value;

b) initializing an iteration index i and a class index c to 0, initializing a starting simplicial complex ($K_0$) to an empty set and repeating the sequence of the following operations until the iteration index i reaches N:

incrementing the iteration index i;

extracting the vertex of rank i ($v_i$) from the vertex table and checking whether the vertex of rank i ($v_i$) is in the neighborhood of a vertex comprised in the simplicial complex of rank i−1 ($K_{i-1}$); and if no vertex of the simplicial complex of rank i ($K_i$) is in the neighborhood of the vertex of rank i ($v_i$), incrementing the rank of class c, forming the simplicial complex of rank i ($K_i$) by adding a new class ($C_c$) composed of the vertex of rank i ($v_i$) to the simplicial complex of rank i−1 ($K_{i-1}$), and assigning rank c to the new class ($C_c$);

if at least one vertex of a single class of the simplicial complex of rank i ($K_i$) is in the neighborhood of the vertex of rank i ($v_i$), forming the simplicial complex of rank i ($K_i$) by adding the vertex of rank i ($v_i$) to the simplicial complex of rank i−1 ($K_{i-1}$) in this one class;

if several vertices of a plurality of classes of the simplicial complex of rank i ($K_i$) are in the neighborhood of the vertex of rank i ($v_i$), forming the simplicial complex of rank i ($K_i$) by grouping together, in the simplicial complex of rank i−1 ($K_{i-1}$), the vertices forming this plurality of classes and the vertex of rank i ($v_i$) in the class of lowest rank and forming a persistence pair comprising:
  i. the first vertex ($v_{ic}$) corresponding to the lowest rank vertex in the lowest rank class of the plurality of classes of the simplicial complex of rank i ($K_i$), this rank being called the appearance rank of the persistence pair (ic); and
  ii. the second vertex ($v_{id}$) corresponding to the vertex of rank of index i ($v_i$), this rank i being called the disappearance rank of the persistence pair (id); and in a decimation step, calculating, for each persistence pair ($v_{ic}$, $v_{id}$) identified, a lifetime associated with the persistence pair ($v_{ic}$, $v_{id}$) calculated as a difference between the disappearance rank of the persistence pair (id) and the appearance rank of the persistence pair (ic), and retaining, in a restricted list, some of the persistence pairs ($v_{ic}$, $v_{id}$) exhibiting the longest lifetimes;

the encoded digital image comprising at least some pixels ($p_{ij}$) corresponding to the vertices constituting the persistence pairs ($v_{ic}$, $v_{id}$) of the restricted list.

2. A non-transitory computer-readable medium storing instructions thereon that, when executed by at least one processor, cause the at least one processor to perform the encoding method according to claim 1.

3. An encoding device, comprising:
at least one processor; and
a non-transitory computer-readable medium storing instructions thereon that, when executed by the at least one processor, cause the at least one processor to perform the encoding method according to claim 1.

4. The method of claim 1, wherein the following steps are also carried out: an iteration index i to N+1 and a class index c are initialized to 0, a starting simplicial complex ($K_N$) is initialized to the empty set and the sequence of the following operations is repeated until the iteration index i reaches 1:
decrementing the iteration index i;
extracting the vertex of rank i ($v_i$) from the vertex table and checking whether the vertex of rank i ($v_i$) is in the neighborhood of a vertex comprised in the simplicial complex of rank i+1 ($K_{i+1}$); and
if no vertex of the simplicial complex of rank i+1 ($K_{i+1}$) is in the neighborhood of the vertex of rank i ($v_i$), incrementing the rank of class c, forming the simplicial complex of rank i ($K_i$) by adding a new class ($C_c$) composed of the vertex of rank i ($v_i$) to the simplicial complex of rank i+1 ($K_{i+1}$), and assigning rank c to the new class ($C_c$);
if at least one vertex of a single class of the simplicial complex of rank i+1 ($K_{i+1}$) is in the neighborhood of the vertex of rank i ($v_i$), forming the simplicial complex of rank i ($K_i$) by adding the vertex of rank i ($v_i$) to the simplicial complex of rank i+1 ($K_{i+1}$) in this one class; and
if several vertices of a plurality of classes of the simplicial complex of rank i+1 ($K_{i+1}$) are in the neighborhood of the vertex of rank i ($v_i$), forming the simplicial complex of rank i ($K_i$) by grouping together, in the simplicial complex of rank i+1 ($K_{i+1}$), the vertices forming this plurality of classes and the vertex of rank i ($v_i$) in the class of lowest rank.

5. The method of claim 1, wherein a first vertex $v_1$, corresponding to a point with indices $i_1$, $j_1$ of the digital image, is in the neighborhood of a second vertex $v_2$, corresponding to a point with indices $i_2$, $j_2$ of the digital image, if $i_1=i_2+1$, and/or if $j_1=j_2+1$.

6. The method of claim 5, further comprising determining a plurality of triangles from triangulation vertices.

7. The method of claim 1, wherein the scalar intensity value ($f_{ij}$) of the digital image results from the combination of a plurality of color intensities of a raw color image.

8. The method of claim 7, further comprising determining a plurality of triangles from triangulation vertices.

9. The method of claim 1, wherein the following steps are also carried out: an iteration index i to N+1 and a class index c are initialized to 0, a starting simplicial complex ($K_N$) is initialized to the empty set and the sequence of the following operations is repeated until the iteration index i reaches 1:
decrementing the iteration index i;
extracting the vertex of rank i ($v_i$) from the vertex table and checking whether the vertex of rank i ($v_i$) is in the neighborhood of a vertex comprised in the simplicial complex of rank i+1 ($K_{i+1}$); and
if no vertex of the simplicial complex of rank i+1 ($K_{i+1}$) is in the neighborhood of the vertex of rank i ($v_i$), incrementing the rank of class c, forming the simplicial complex of rank i ($K_i$) by adding a new class ($C_c$) composed of the vertex of rank i ($v_i$) to the simplicial complex of rank i+1 ($K_{i+1}$), and assigning rank c to the new class ($C_c$);
if at least one vertex of a single class of the simplicial complex of rank i+1 is in the neighborhood of the vertex of rank i ($v_i$), forming the simplicial complex of rank i ($K_i$) by adding the vertex of rank i ($v_i$) to the simplicial complex of rank i+1 ($K_{i+1}$) in this one class; and
if several vertices of a plurality of classes of the simplicial complex of rank i+1 ($K_{i+1}$) are in the neighborhood of the vertex of rank i ($v_i$), forming the simplicial complex of rank i ($K_i$) by grouping together, in the simplicial complex of rank i+1 ($K_{i+1}$), the vertices forming this plurality of classes and the vertex of rank i ($v_i$) in the class of lowest rank.

10. The method of claim 9, wherein a first vertex $v_1$, corresponding to a point with indices $i_1$, $j_1$ of the digital image, is in the neighborhood of a second vertex $v_2$, corresponding to a point with indices $i_2$, $j_2$ of the digital image, if $i_1=i_2+1$, and/or if $j_1=j_2+1$.

11. The method of claim 10, wherein the scalar intensity value ($f_{ij}$) of the digital image results from the combination of a plurality of color intensities of a raw color image.

12. The method of claim 11, further comprising determining a plurality of triangles from triangulation vertices.

* * * * *